United States Patent [19]

Van Gent

[11] Patent Number: 5,357,098
[45] Date of Patent: Oct. 18, 1994

[54] MOUNTING STRUCTURE FOR ELECTRO-OPTICAL DEVICES

[75] Inventor: Hans M. Van Gent, LD Venlo, Netherlands

[73] Assignee: OCE-Nederland, B.V., Venlo, Netherlands

[21] Appl. No.: 81,156

[22] Filed: Jun. 25, 1993

[30] Foreign Application Priority Data

Jun. 29, 1992 [EP] European Pat. Off. ........ 92201912.0

[51] Int. Cl.$^5$ ............................................. H01J 40/14
[52] U.S. Cl. .................................. 250/208.1; 250/239
[58] Field of Search ........................... 250/208.1, 239; 257/433; 348/294; 358/482

[56] References Cited

U.S. PATENT DOCUMENTS 4,999,484  3/1991  Kaneko ...................... 250/208.1
5,063,286 11/1991  Kaneko ...................... 250/208.1

Primary Examiner—David C. Nelms
Assistant Examiner—K. Shami
Attorney, Agent, or Firm—Birch, Stewart, Kolasch & Birch

[57] ABSTRACT

A scanning head is provided suitable for scanning large-size documents including a plurality of contact type CCDs staggered on a common substrate with overlapping end portions, so that their sensitivity ranges are adjoined to one another, adjacent ends of two CCDs being fixed on the substrate by stops, and the opposite ends of these CCDs being elastically supported to allow for thermal expansion or contraction, there being interposed between the first CCD and the third CCD, a spacer which has a thermal expansion coefficient comparable to that of the CCDs, so that the sensitivity ranges of the second and third CCDs are matched to one another, irrespective of the expansion or contraction of the second CCD.

5 Claims, 1 Drawing Sheet

MOUNTING STRUCTURE FOR ELECTRO-OPTICAL DEVICES

BACKGROUND OF THE INVENTION

1. Field of the Invention

The present invention relates to a mounting structure for a plurality of electro-optical devices, and more particularly to a mounting structure for charge coupled devices (CCDs) in an image scanner or for LED-arrays in a printer.

2. Discussion of Related Art

In the art of image scanners using CCDs, reduction type systems and so-called contact type systems have been known. In a reduction type system, a line of a document to be scanned is imaged onto the CCD at a reduced scale, and the operative range of the CCD, i.e. the length of the line on the document to which the CCD is sensitive, is substantially larger than the length of the CCD itself. In a contact type system, the CCD is directly facing the document to be scanned and, accordingly, the sensitive range is substantially equal to the length of the CCD. In practice, the sensitive range is slightly smaller than the length of the CCD, because the CCD element has end portions which are not light-sensitive.

In commercially available CCDs, the number of light-sensitive elements which are sensitive to individual pixels is limited to approximately 5000. As a consequence, in both reduction type systems and contact type systems, the length of a line segment which can be scanned with a single CCD is along a line in such a manner that their operative ranges are consecutive. The CCDs must be carefully positioned in order to avoid the production of junction errors at the borders of the respective operative ranges when the scanned image is reproduced. However, since the CCDs and the substrate on which they are mounted are generally subject to different thermal expansion, for example because they are heated by a lamp used for illuminating the document, it is difficult to maintain a correct positional relationship between the CCDs.

In U.S. Pat. No. 4,849,820 there is disclosed a reduction type scanner in which two CCDs are mounted on a common base plate which is fixed only at one end, so that it may expand or contract in the case of temperature variations. The first CCD is directly mounted on the base plate, and the second CCD is mounted on a secondary support plate one end of which is fixed to the base plate in the vicinity of the free end of the latter. The base plate and the support plate consist of different materials, and the lengths of these plates are so adapted to the respective thermal expansion coefficients that the thermal expansions cancel each other and the position of the second CCD relative to the first one remains substantially unchanged.

However, this solution is not applicable in cases where the electro-optical devices, e.g. contact type CCDs, have a substantial length and the thermal expansion of the CCDs themselves must be taken into consideration. In such cases, if only two CCDs are employed, the CCDs may be mounted in a staggered configuration with overlapping end portions, so that their operative ranges are consecutive, and both CCDs may be fixed to the substrate in the vicinity of their adjacent end portions. If, however, a third CCD is to be added, thermal expansion becomes a serious problem.

SUMMARY OF THE INVENTION

Therefore, it is an object of the present invention to provide a mounting structure for a plurality of electro-optical devices which will overcome the above-noted disadvantages.

It is a further object of the present invention to provide a mounting structure for three or more electro-optical devices, wherein junction errors can be avoided even if the operative range of the respective devices is slightly smaller than the overall length thereof and the devices are subject to significant thermal expansion.

The foregoing objects and others are accomplished in accordance with the present invention, generally speaking, by providing a mounting structure for a plurality of elongated electro-optical devices disposed along a line on a common substrate in such a manner that the positional relationship between the borders of the operative ranges of the respective individual devices is maintained regardless of thermal expansion of the devices and/or the substrate. According to the invention, the junction between the first and the second electro-optical devices is used as a reference position for these two devices and also for a third device adjoining the free end of the second device. The third device is held in engagement with a spacer which is fixed at a reference position and simulates the thermal expansion or contraction of the second electro-optical device, so that the third device will always be positioned correctly relative to the free end of the second device. The respective electro-optical devices have operative ranges slightly smaller than the length of the respective devices and are staggered with overlapping end portions so that their operative ranges are adjoined to or functionally continuous with one another.

The respective free ends of the first and second electro-optical devices may be engaged by spring means which hold the devices in firm engagement with fixed stop members provided at a reference position. Likewise, spring means may be provided for pressing the third device against the free end of the spacer. Since the spacer is axially aligned with the first and third device, no bending stresses will be generated, even if the third device is firmly pressed against the spacer.

If more than three devices are to be used, additional spacers are axially interposed between the second and the fourth device, the third and the fifth device and so on, and the two alternating sequences of spacers and electro-optical devices formed in this way are axially compressed between spring means provided at the opposite ends thereof.

BRIEF DESCRIPTION OF DRAWINGS

A preferred embodiment of the invention will be described below in conjunction with the sole figure which shows a schematic view of a mounting structure for three contact type CCDs.

DETAILED DISCUSSION

Figure 1:
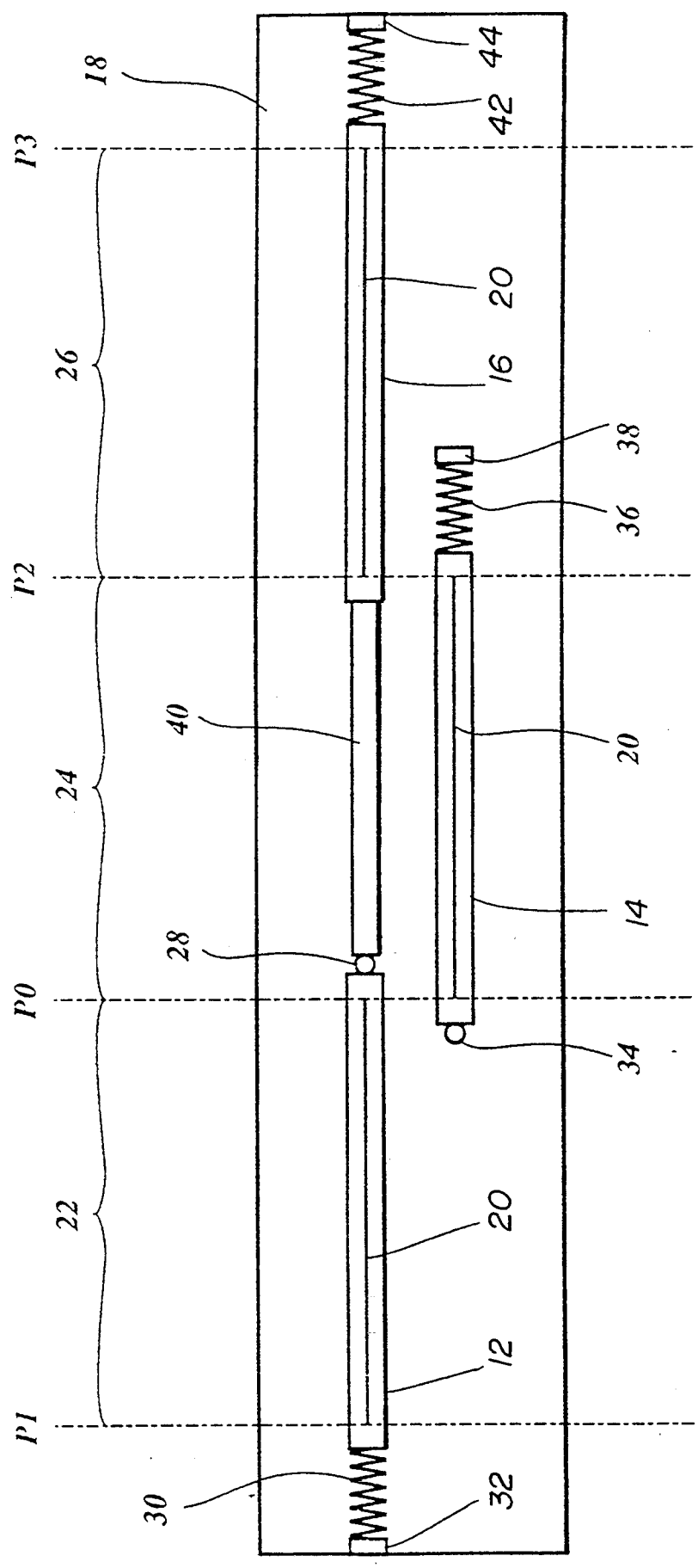

As is shown in the figure, a scanning head 10 comprises three CCDs 12,14,16 mounted on a common substrate 18. Each CCD has a length of approximately 35 cm and comprises a sensitive line 20 which has a length of 304.8 mm and is composed of 4800 individual light-sensitive elements, corresponding to an image resolution of 15.75 pixel/mm (400 pixel/inch). The scanning head 10 is moved relative to a document to be scanned in the vertical direction in the drawing. The sensitive lines 20 of the individual CCDs define operative ranges 22,24 and 26, respectively, in which the CCDs are sensitive to the light emitted from the document. The CCDs 12,14,16 are staggered in such a manner that their non-sensitive end portions overlap and the sensitive ranges 22, 24 and 26 are consecutive to form a total sensitive range with a width of 914.4 mm.

The second CCD 14 is laterally offset from the first and third CCDs 12 and 16 which are aligned with one another. In spite of this offset, the image information from all three CCDs can be combined to obtain the image data of a complete line of the scanned document. This can be achieved, for example, by a data-processing system taking into account the time required by the scanning head 10 to travel the distance of offset between the CCDs. Alternatively, appropriate optical deflection means may be provided between the CCDs and the surface of the document, so that the sensitive lines 20 of all three CCDs receive simultaneously the light from a continuous straight line on the document.

One end of the first CCD 12 rests against a stop 28 which is fixed on the substrate 18. The opposite end of the CCD 12 is biased in the direction of the stop 28 by means of a spring 30 which is supported at a spring seat 32 mounted on the substrate 18. Likewise, the end of the second CCD 14 adjacent to the first CCD 12 rests against a stop 34, and a spring 36 and spring seat 38 are associated with the opposite end of the CCD 14. The stops 28 and 34 are disposed at such positions that the borders of the sensitive ranges 22 and 24 of the first and second CCD 12 and 14 coincide at a reference position P0. It will be understood that fine-adjusting means which are known per-se and are therefore not shown in the drawing are associated with the stops 28 and 34, so that the ends of the sensitive lines 20 can be adjusted exactly on the reference position P0. If the CCDs 12 and 14 are subject to thermal expansion, this will have no significant effect on the adjustment of the ends of the sensitive lines on the reference position, because the stops 28 and 34 are located directly in the vicinity of the respective ends of the sensitive lines.

On the other hand, the springs 30 and 36 permit slight longitudinal displacements of the associated free ends of the CCDs 12 and 14 which may be caused by temperature changes. As a result, the positions P1 and P2 of the borders of the sensitive ranges 22 and 24 associated with the free ends of the CCDs 12 and 14 may be shifted by a few tenths of a millimeter relative to the reference position P0.

The third CCD 16 is biased against an elongated spacer 40 by means of a spring 42 engaging the opposite end of the CCD 16 and supported by a spring seat 44. The spacer 40 rests against the stop 28 and has a length which is so adapted to the length of the CCDs that the end of the sensitive line 20 of the third CCD 16 is held exactly in the position P2. The spacer 40 is made of a material such as glass, Invar or porcelain, which has substantially the same coefficient of thermal expansion ($\propto$) as the CCD 14 ($\propto_{CCD} = 4 \cdot 10^{-6}/K; \propto_{Invar} = 2 - 6 \cdot 10^{-6}/K; \propto_{glass} = 4-9 \cdot 10^{-6}/K; \propto_{porcelain} = 3-4 \cdot 10^{-6}/K$). When the second CCD 14 expands or contracts under temperature changes and the position P2 of the end of the sensitive line 20 of the CCD 14 is shifted, the thermal expansion or contraction of the spacer 40 will cause the same shift of the end of the sensitive line of the third CCD 16. Thus it is assured that the sensitive ranges 24 and 26 of the second and third CCDs are always matched to one another, irrespective of temperature changes.

Due to the expansion or contraction of the spacer 40, the third CCD 16 is displaced in its entirety. The position P3 of the border of the sensitive range 26 opposite to the spacer 40 is therefore shifted by an amount which corresponds to the accumulated thermal expansion or contraction of the spacer 40 and the third CCD 16.

In FIG. 1, a common stop 28 is shown for the first CCD 12 and for the spacer 40. It will be understood, however, that the spacer 40 may rest against a separate stop which is provided with appropriate fine-adjusting means. In any case, the spacer 40 should, however, be aligned with the first and third CCDs 12 and 16, so that no bending stresses may be produced when the whole arrangement of the CCDs 12 and 16 and the spacer 40 is compressed between the springs 30 and 42. With this arrangement, the length of the spacer 40 must be slightly smaller than the length of the second CCD 14. As a consequence, the spacer 40 cannot fully keep up with the thermal expansion or contraction of the second CCD 14 if the coefficients of thermal expansion of the spacer 40 and the CCDs are exactly identical. This minor error may be compensated for by selecting a material with a slightly larger coefficient of thermal expansion for the spacer 40.

The invention is not limited to the embodiment described above, but includes any possible modification that may occur to a person skilled in the art. For example, the invention is not only applicable to CCDs, but also to other elongated electro-optical devices, such as LED arrays and the like. These modifications are intended to be encompassed within the scope of the invention.

I claim:

1. A mounting structure for a plurality of elongated electro-optical devices disposed along a line on a common substrate in such a manner that the positional relationship between the borders of the operative ranges of the individual devices is maintained irrespective of thermal expansion of the devices or the substrate, said mounting structure comprising:

a common substrate for supporting a plurality of elongated electro-optical devices, a plurality of electro-optical devices on said common substrate having operative ranges slightly smaller than a length of each respective electro-optical device, staggered with overlapping end portions so that their operative ranges are adjoined to one another, said adjacent ends of two of said devices being fixed on said substrate such that said operative ranges of these two devices are adjoined at a reference position (P0), with respective remaining ends of said two devices being free to move longitudinally relative to said common substrate, and a spacer having a length and a thermal expansion coefficient matched to those of said electro-optical devices fixed with one end in a vicinity of said reference position P0, and its other end being free to move longitudinally, one end of a third electro-optical device being held in engagement with said free end of said spacer.

2. A mounting structure according to claim 1, wherein at least one of said two electro-optical devices is elastically biased in a longitudinal direction against a stop which is fixed on said substrate.

3. A mounting structure according to claim 2, wherein said third electro-optical device is elastically biased in longitudinal direction against said spacer, an opposite end of said spacer being supported by a stop fixed on said substrate.

4. A mounting structure according to claim 1, wherein said spacer and two of said electro-optical devices adjacent thereto are axially aligned.

5. A mounting structure according to claim 4, wherein said thermal expansion coefficient of said spacer is larger than that of the electro-optical devices in a proportion corresponding to a difference in length between said spacer and that electro-optical device disposed in parallel therewith.

* * * * *